`United States Patent` [19]

Kuribara et al.

[11] Patent Number: 5,004,090
[45] Date of Patent: Apr. 2, 1991

[54] ROTATION DEVICE WITH A SEALING PLATE

[75] Inventors: Motoaki Kuribara, Gumma; Ikuo Fujino, Ashikaga, both of Japan

[73] Assignee: Mitsuba Electric Mfg. Co., Ltd., Gumma, Japan

[21] Appl. No.: 122,155

[22] Filed: Nov. 18, 1987

[30] Foreign Application Priority Data

Nov. 19, 1986 [JP] Japan .................. 61-275557

[51] Int. Cl.$^5$ ............. F16D 41/06; F16J 15/34; F16C 33/76
[52] U.S. Cl. .................. 192/112; 192/45; 277/94; 277/168; 384/477
[58] Field of Search ........ 192/45, 42, 112, 113 B; 74/7 C; 384/130, 147, 477, 484; 277/94, 168

[56] References Cited

U.S. PATENT DOCUMENTS

| 2,237,616 | 4/1941 | Smith | 384/477 |
| 2,275,325 | 3/1942 | Searles | 384/477 X |
| 2,355,805 | 8/1944 | Koepp | 384/484 |
| 2,718,441 | 9/1955 | Smith | 384/484 |
| 2,766,082 | 10/1956 | Ritchey | 384/484 |
| 2,915,345 | 12/1959 | Workman | 384/484 |
| 3,032,346 | 5/1962 | Sullivan | 277/168 |
| 3,396,977 | 8/1968 | Iguchi | 384/477 X |
| 3,630,530 | 12/1971 | Mackas et al. | 277/94 |
| 3,700,296 | 10/1972 | Bugmann | 384/484 |
| 3,854,734 | 12/1974 | West | 384/484 X |
| 4,178,805 | 12/1979 | Mazzorana | 74/6 |
| 4,183,592 | 1/1980 | Sudo et al. | 277/94 X |
| 4,440,033 | 4/1984 | Kurihara et al. | 74/7 A |
| 4,733,978 | 3/1988 | Colanzi et al. | 277/94 X |

FOREIGN PATENT DOCUMENTS

| 592104 | 2/1960 | Canada | 384/484 |
| 3426185 | 1/1985 | Fed. Rep. of Germany | 384/147 |
| 54-125340 | 9/1979 | Japan | 384/477 |
| 54-132045 | 10/1979 | Japan | 384/484 |
| 56-3322 | 1/1981 | Japan | 192/45 |
| 57-37775 | 8/1982 | Japan | . |
| 1099936 | 1/1968 | United Kingdom | . |
| 1113449 | 5/1968 | United Kingdom | . |
| 1277784 | 6/1972 | United Kingdom | . |
| 1481983 | 8/1977 | United Kingdom | . |
| 2017232 | 10/1979 | United Kingdom | . |
| 1561737 | 2/1980 | United Kingdom | . |
| 2086495 | 5/1982 | United Kingdom | 192/45 |

Primary Examiner—Richard Lorence
Attorney, Agent, or Firm—Darby & Darby

[57] ABSTRACT

There is disclosed a rotation device, such as an overrunning clutch and a ball bearing. The rotation device includes a cylindrical inner member; a hollow cylindrical outer member coaxially and rotatably disposed on the inner member; an annular extension integrally formed with the outer periphery of the rear end face of the outer member; and an annuloar sealing plate for aligning the axes of the outer and inner members with each other. An inner space for receiving a lubricating agent is defined by the inner member and the inner face of the outer member. The inner space opens to the rear end face of the outer member. The annular extension has an inwardly opening annular groove circumferentially formed therein. The sealing plate rotatably fits around the inner member and fixedly fixed in the annular extension in such a manner that the opening of the inner space is closed by the sealing plate. The sealing plate includes: an annular plate body covering the opening of the inner space with one of its opposite faces in contact with the rear end face of the outer member; an annular peripheral, wall integrally formed with the outer periphery of the other face of the plate body; and an annular ridge integrally formed around the peripheral wall and protruding into the groove of the annular extension.

7 Claims, 8 Drawing Sheets

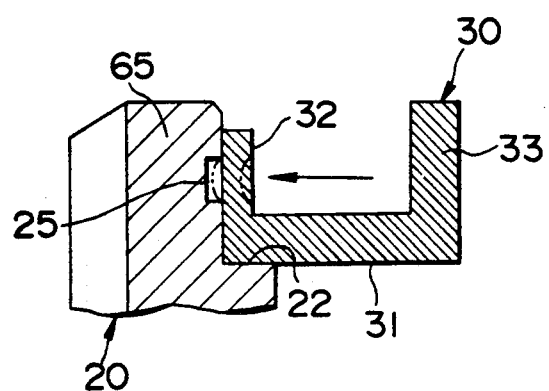
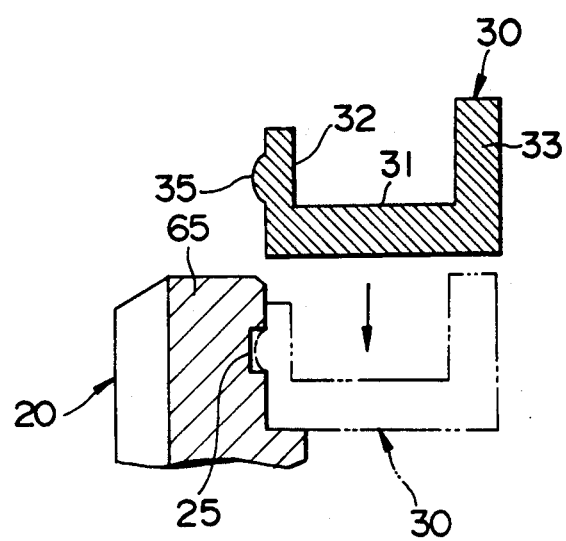
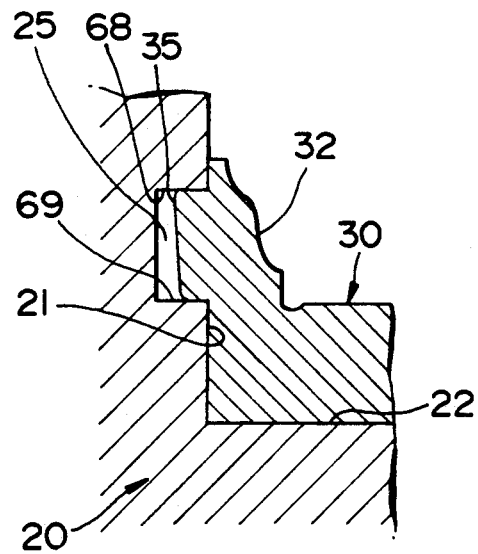

ROTATION DEVICE WITH A SEALING PLATE

BACKGROUND OF THE INVENTION

This invention relates to a rotation device, such as a clutch and a bearing, for disposing between two parts of a mechanism, such as driving and driven parts of a starting motor used for engines of automobiles. This invention also relates to a method of fabricating the rotation device.

A starting motor with a conventional overrunning clutch will hereinafter be described in order to explain the background of the present invention.

FIG. 1 illustrates a starting motor having a typical example of the conventional overrunning clutch, in which an output shaft 3 is operatively connected to a motor body 1 via an overrunning clutch 2. The output shaft 3 has a pinion concentrically and integrally formed with its front end (i.e., the left end in FIG. 1). An electromagnetic unit 4 is connected to the output shaft 3 for reciprocating the output shaft 3 in its axial direction so as to engage and disengage the pinion of the output shaft with and from a ring-shaped gear of an engine.

The overrunning clutch 2 includes: a shaft-like inner race 6 rotatably supported by a frame 12; a hollow cylindrical outer casing 5 rotatably disposed around the inner race 6; a plurality of locking rollers 7 interposed between the outer casing 5 and the inner race 6; and an annular sealing plate 8 rotatably disposed around the inner race 6 and fixed to the outer casing 5. As shown in FIG. 2, the outer casing 5 has a plurality of chambers 13 formed in it, at equal angular intervals. Each of these chambers 13 opens to a rear end face 16 of the outer casing 5. Reference numeral 14 denotes coil springs for pressing the locking rollers 7. The locking rollers 7 are received in the respective chambers 13 for drivingly connecting and disconnecting the outer casing 5 to and from the inner race 6. More specifically, upon the rotation of the outer casing 5 in one direction, the locking rollers 7 connects the outer casing 5 to the inner race 6, and upon the rotation of the inner race 6 in the same direction, the locking rollers 7 disconnects the inner race 6 from the outer casing 5. Grease as a lubricating agent is filled within the chambers 13. The sealing plate 8 is provided for aligning the axes of the outer casing 5 and inner race 6 and also for closing the openings of the chambers 13 so as to prevent the leakage of the grease out of the chambers 13.

The outer casing 5 has a driven gear formed therearound thereby being drivingly connected to the motor body 1. On the other hand, the inner race 6 is splined to the output shaft 3. That is to say, the clutch 2 is adapted to transfer torque from the motor body 1 to the output shaft 3 but not from the output shaft 3 to the motor body 1.

With the aforementioned starting motor which employs the overrunning clutch 2, it is enabled to rotate the ring-shaped gear of the engine so that the engine is started. Also, it is enabled, with this starting motor, to prevent the motor body 1 from being subjected to unnecessary torque during the operation of the engine.

In order to assure the smooth connecting and disconnecting actions of the locking rollers 7, the overrunning clutch 2 is required to have the following conditions:
(1) The axis of the outer casing 5 is accurately aligned with that of the inner race 6.
(2) The openings of the chambers 13 are completely closed so that the grease does not leak out of the chambers 13.
(3) The sealing plate 8 is firmly fixed to the outer casing 5.

In the above-mentioned clutch 2, the inner face of the sealing plate 8 serves as a part of the supporting surface which is slidably in contact with the inner race 6. From this perspective, how the sealing plate 8 is fixed to the outer casing 5 is one of the fundamental elements in determining whether or not the above-mentioned conditions are satisfied. In other words, an improvement of the fixing technique for the sealing plate may result in enhancement of the quality of the clutch 2.

As to the clutch shown in FIG. 1, the sealing plate 8 is in direct contact with the rear end face 16 of the outer casing 5 and also fits in an annular extension 15 which is formed on the periphery of the rear end face 16 of the outer casing 5. The periphery of this sealing plate 8 is caulked by means of a tool such as a caulking chisel so that the sealing plate is firmly fixed to the annular extension 15. Furthermore, a snap ring 9 fits in the annular extension to serve as a stopper for the sealing plate 8.

Although in this clutch 2, the axis of the outer casing is aligned with that of the inner race 6 with satisfactory accuracy, there arises problems with the fixing strength and the sealing property of the sealing plate 8 not being satisfactory.

Japanese Patent Publication No. sho 57-37775 discloses a prior art clutch, which may solve the above-mentioned problems. As shown in FIG. 3, the disclosed outer casing 5 has an annular extension 15 having a projecting height not less than the thickness of the sealing plate and also having an inwardly opening groove 10 circumferentially formed in the annular extension 15. A part of the periphery of the sealing plate 8 protrudes into the groove 10 by being plastically deformed, and thus the sealing plate 8 is attached to the outer casing 5. More specifically, the groove 10 is formed at such a position that the distance between the rear end face 16 of the outer casing 5 and the groove 10 is smaller than the thickness of the sealing plate 8. The sealing plate 8 is pressed by a pressing machine so that the periphery of the sealing plate 8 is deformed.

According to this prior art, the sealing plate 8 may be firmly secured to the outer casing 5, and also close the openings of the chambers 13. However, even with such a clutch, the following problems arise.

Since the periphery of the sealing plate 8 is deformed to form a protrusion into the groove 10 by the pressing operation, that is, since the sealing plate 8 is extended in a radially outward direction perpendicular to the direction in which the pressing force is applied, a large pressing machine which is capable of applying a substantially large pressing force is required. Moreover, the large pressing force may result in unnecessary deformation of the inner portion of the sealing plate 8, which may lower the accuracy with which the axis of the outer casing 5 is aligned with that of the inner race 6.

SUMMARY OF THE INVENTION

Accordingly, it is an object of the present invention to provide a rotation device such as a clutch or a bearing, and a method of fabricating the rotation device, in which the sealing effect of the sealing plate is enhanced.

Another object of the present invention is to provide a rotation device and a method of fabricating the rotation device, in which the sealing plate requires comparatively small pressing force in attaching it to the outer casing, and thereby the accuracy of the axial alignment of the outer casing with the inner race is enhanced.

With these and other objects in view, one aspect of the present invention is directed to a rotation device including, an inner member, an outer member, an annular extension, and a sealing plate. The sealing plate includes: an annular plate body covering the opening of the inner space, such as a chamber for receiving grease, with one of its opposite faces in contact with the rear end face of the outer member; an annular peripheral wall integrally formed with an outer periphery of the other face of the plate body; and an annular ridge integrally formed around the peripheral wall and protruding into the groove of the annular extension. The annular ridge is firmly engaged with an inner wall of the groove of the annular extension, and thereby the one face of the plate body is firmly attached to the rear end face of the outer member so that the inner space is hermetically sealed.

It is preferred that the annular groove of the annular extension is disposed at such a position that the distance between the rear end face of the outer member and the annular groove is not smaller than the thickness of the plate body of the sealing plate.

The annular ridge of the peripheral wall of the sealing plate may be formed by plastic deformation of the periphoral wall.

Another aspect of the present invention is directed to a method of fabricating the rotation device. An annular peripheral wall is integrally formed with a periphery of one of the sealing plate's opposite faces so that the peripheral wall projects from the one of the opposite faces of the sealing plate. Also, an inwardly opening annular groove is circumferentially formed in the annular extension, at such a position that a distance between the rear end face of the outer member and the groove is not smaller than the thickness of the sealing plate. After the forming of both the peripheral wall and the annular groove, the inner member is inserted into the outer member. Thereafter, the sealing plate is placed in the annular extension with the other face in contact with the rear end face of the outer member. Finally, the peripheral wall of the sealing plate is pressed generally radially outward so that the peripheral wall is plastically deformed. This pressing operation results in extrusion of a part of the peripheral wall into the annular groove, and thereby the other face of the sealing plate is firmly attached to the rear end face of the outer member so that the inner space is hermetically sealed.

BRIEF DESCRIPTION OF THE DRAWINGS

In the drawings:

FIG. 19 is a fragmentary axial-sectional view of a clutch, showing a still another method of fixing the sealing plate to the outer casing;

FIG. 20 is a fragmentary axial-sectional view of a sealing plate and an outer casing, showing a further method of fixing the sealing plate to the outer casing; and FIG. 21 is a fragmentary axial-sectional view of a modified form of a ridge in FIG. 5.

DETAILED DESCRIPTION OF THE PREFERRED EMBODIMENTS

Preferred embodiments of the present invention will now be explained.

Figure 1:
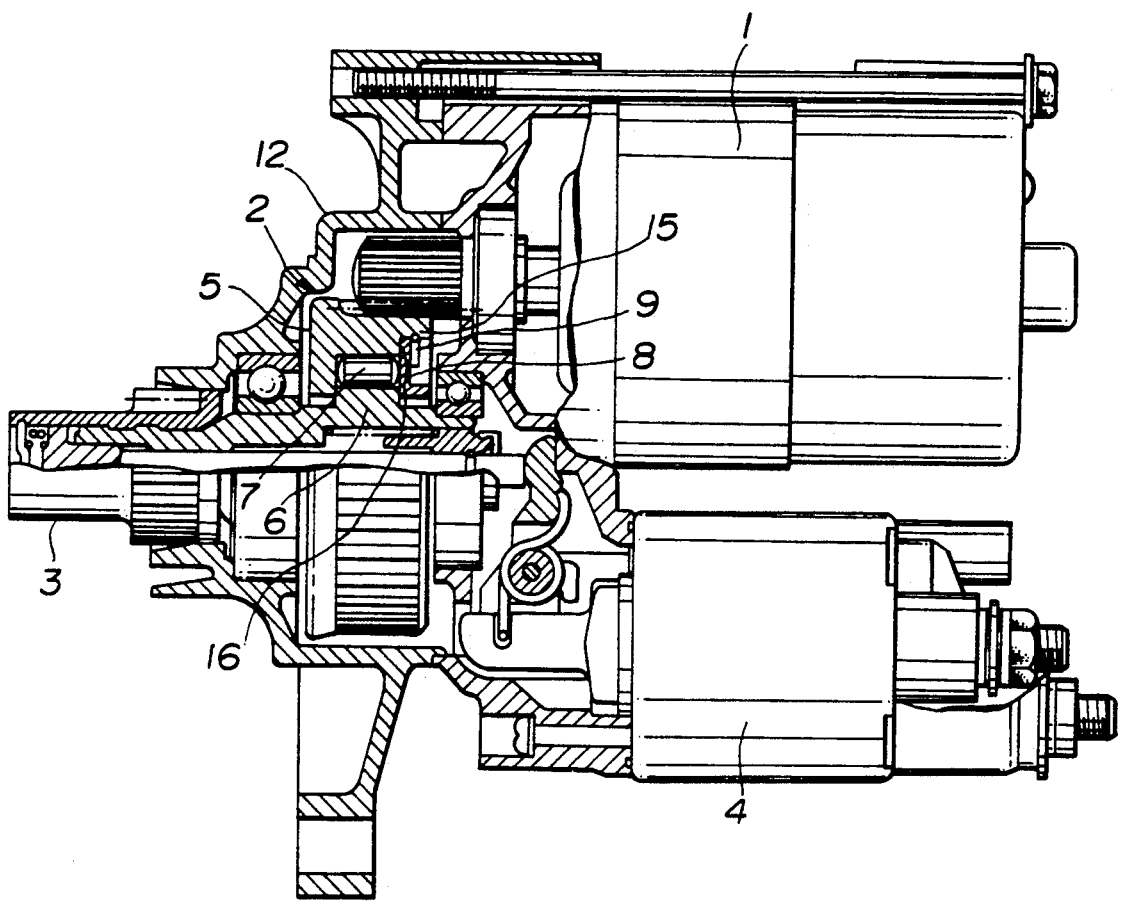
FIG. 1 is a side-elevational view, partly in section, of a staring motor which has a conventional overrunning clutch.
Figure 2:
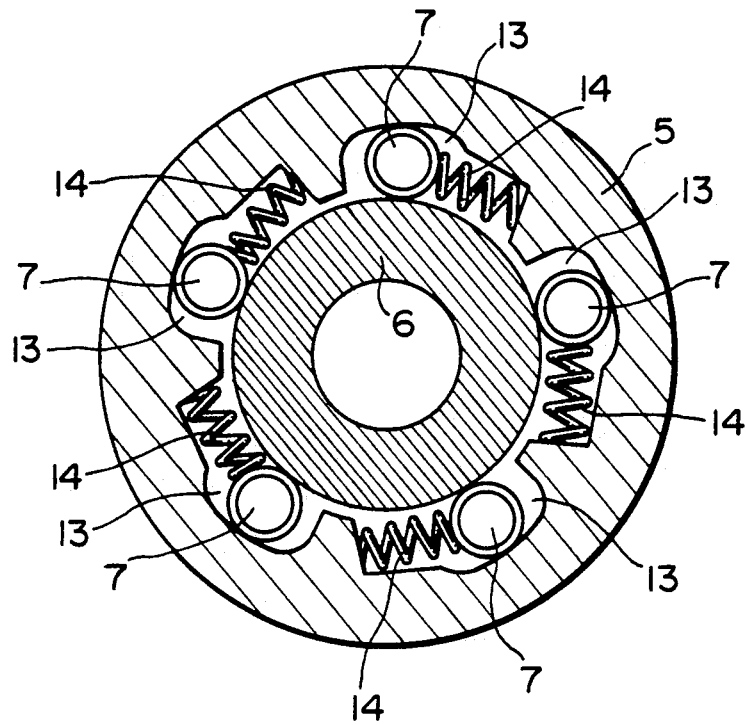
FIG. 2 is a cross-sectional view of the overrunning clutch in FIG. 1.
Figure 3:
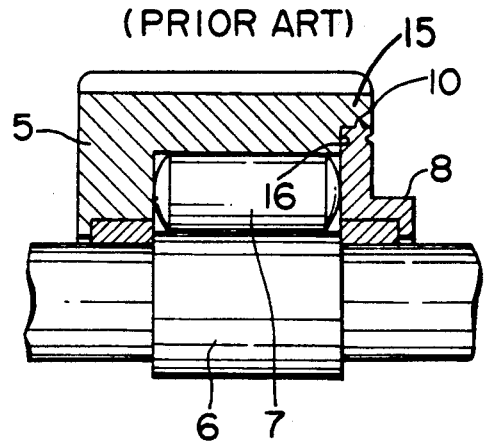
FIG. 3 is a fragmentary axial-sectional view of another conventional overrunning clutch.
Figure 4:
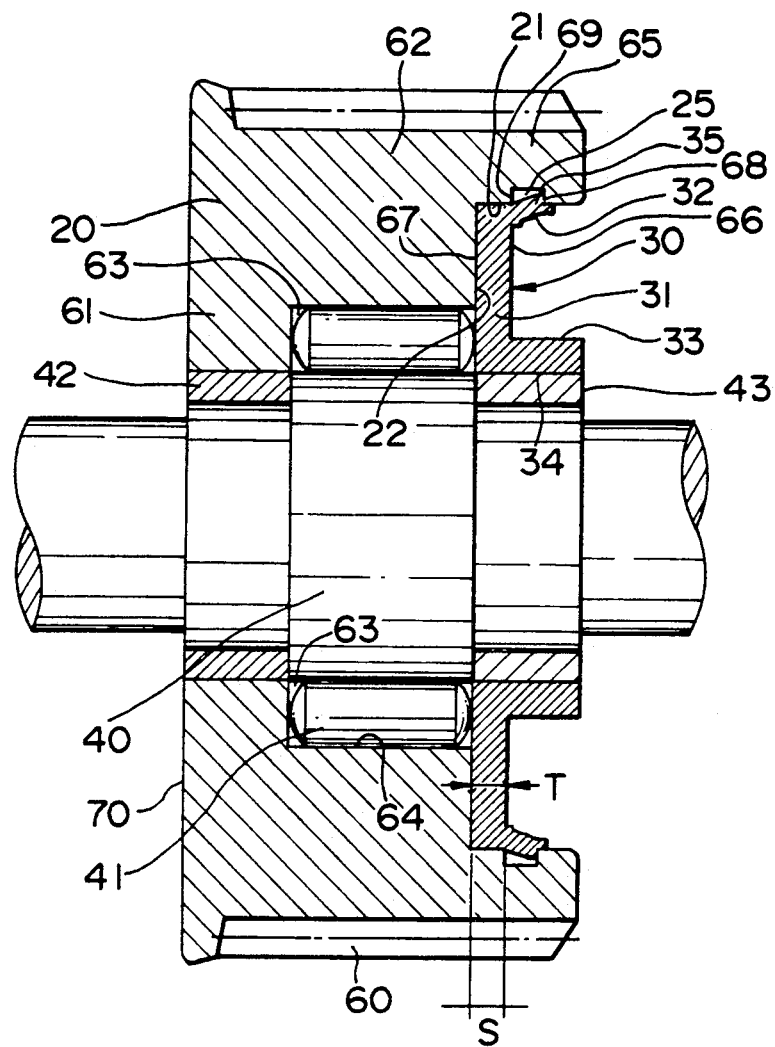
FIG. 4 is an axial sectional view of a overrunning clutch according to the present invention.
Figure 5:
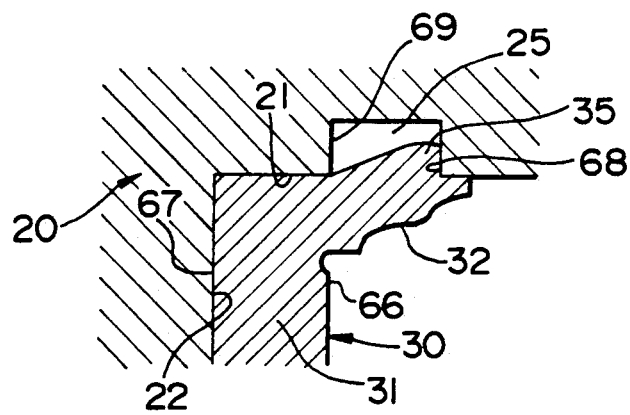
FIG. 5 is an enlarged fragmentary axial-sectional view of the clutch in FIG. 4.

FIG 4 shows a cross-sectional view of an overrunning clutch according to the present invention. Reference numeral 40 designates a substantially cylindrical inner race which is adapted to be drivingly connected, for example, to an engine of an automobile. On this inner race 40, there is coaxially and rotatably disposed a hollow cylindrical outer casing 20 which is fabricated through forging and quenching. This outer casing is provided with a driven gear 60 around its outer face, the driven gear 60 being adapted to be drivingly connected, for example, to an electric motor. The outer casing 20 includes a front end portion 61 and a rear end portion 62. The front end portion 61 of the outer casing 20 fits around the inner race 40 through a metal journal 42, while the rear end portion 62 is spaced from the inner race 40 so that inner spaces or chambers 63 are defined by the inner race 40 and the inner face 64 of the rear end portion 62. These chambers 63 open to the rear end face 22 of the outer casing 20 and receive a plurality of locking rollers 41 together with a lubricating agent such as grease. An annular extension 65 is integrally formed with the periphery of the rear end face 22 of the outer casing 20 in such a manner that it extends rearward from the rear end face 22. An inwardly opening annular groove 25 having a U-shaped cross-section is formed in the annular extension 65.

Reference numeral 30 designates a substantially annular sealing plate which is made of such a material that the Young's modulus of the sealing plate 30 is lower than that of the outer casing 20. The sealing plate 30 comprises an annular plate body 31, an annular peripheral wall 32 integrally formed with the outer periphery of the plate body 31 and projecting from the right side 66 of the plate body 31, a boss wall 33 integrally formed with the inner periphery of the plate body 31 and projecting parallel to the peripheral wall 32.

This sealing plate 30 fits in the annular extension 65 in such a manner that the left side 67 of the plate body 31 is in direct contact with the rear end face 22 of the outer casing 20, and that inner surface 34 of the boss wall 33 is rotatably in contact with the inner race 40 through another metal journal 43. That is to say, the sealing plate 30 serves as means for aligning the axis of the outer casing 20 with that of the inner race 40 as well as for closing the opening of the chambers 63.

An annular ridge 35 is formed around the peripheral wall 32 so that it projects into the groove 25 of the annular extension 65. This ridge 35 is in engagement with the rear wall 68 of the groove 25 so that the sealing plate 30 is pressed against and firmly fixed to the rear end face 22 of the outer casing 20. That is, the groove 25 is formed at a position such that the distance S between the groove 25 and the rear end face 22 of the outer casing 20 is not smaller than the thickness T of the plate body 31 of the sealing plate 30.

One of the most common methods of forming the ridge 35 is to plastically deform the peripheral wall 32 so that a portion of the peripheral wall 32 is extruded into the groove 25.

According to the above-mentioned construction, an excellent leak tightness is obtained between the sealing plate 30 and the outer casing 20 since the ridge 35 is tightly engaged with the rear wall 68 of the groove 25 and thereby the plate body 31 is firmly pressed against the rear end face 22 of the outer casing 20.

The above-mentioned method of forming the ridge 35 does not require any excessive labour if the ridge 35 is made of a suitable material and the action of leverage wherein the inner edge of the front wall 69 of the groove 25 acts as a fulcrum is achieved.

Furthermore, during the ridge-forming operation, the plate body 31, including a portion of the peripheral wall 32 left side of the groove 25, is in a firm contact with the outer casing 20. Therefore, the plate body 31 of the sealing plate 30 is kept free from deformation which is caused by the stress transferred from the deformed part of the peripheral wall 32. This fact ensures that the inner surface 34 of the boss wall 33 of the sealing plate 30 is not deformed unexpectedly during the ridge-forming process.

The method of fabricating the overrunning clutch of the foregoing embodiment will now be explained.

Firstly, a sealing plate 30 having the boss wall 33, the plate body 31 and the peripheral wall 32 is prepared. At this point of time, the ridge 35 is not formed yet on the peripheral wall.

Secondly, an outer casing 20 having aforementioned construction is prepared.

Figure 6:
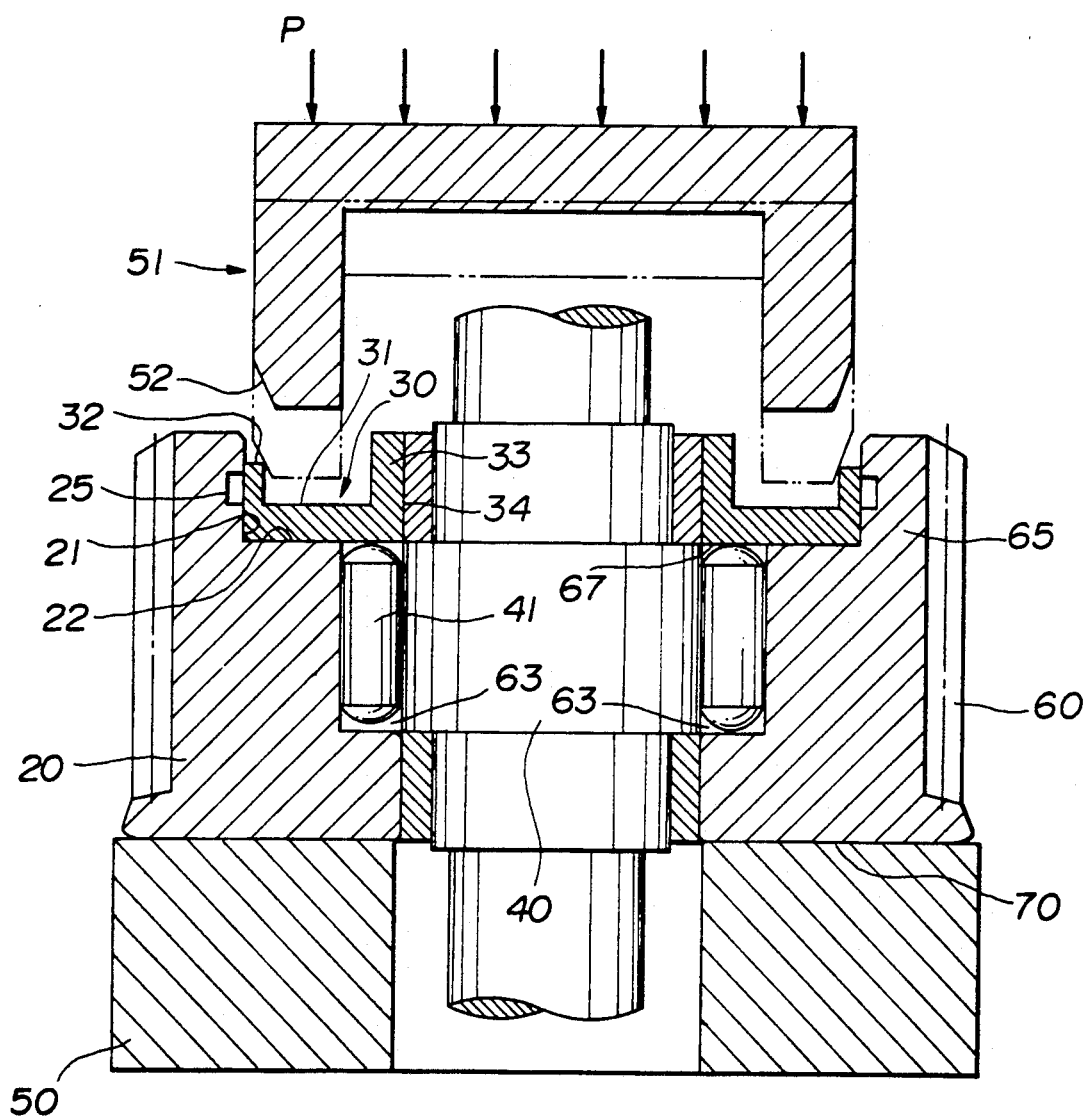
FIG. 6 is an axial-sectional view of the outer casing and the sealing plate, showing how to fix the sealing plate to the outer casing.

Then, the outer casing 20 is placed on a pressing machine so that the axis of the outer casing 20 coincides with the loading axis of the pressing machine and that the front end face 70 of the outer casing 20 is supported by the base 50. The inner race 40 is inserted into the outer casing 20, the locking rollers 41 and roller-pressing coil springs (not shown) are put into the chambers 63, and then, the grease is filled in the chambers 63. Thereafter, as shown in FIG. 6, the sealing plate 30 is placed in the annular extension 65 so that the left side 67 of the plate body 31 is in contact with the rear end face 22 of the outer casing 20, and simultaneously, the peripheral wall 32 of the sealing plate 30 is in contact with the inner surface 21 of the annular extension 65. By this placing operation, the axis of the outer casing 20 is primarily aligned with that of the inner race 40.

Next, a pressing head 51 of the pressing machine is moved in a direction indicated by the arrows P in FIG. 6 along the loading axis of the pressing machine and is brought into contact with the sealing plate 30. The pressing head 51 has a cylindrical body and a tapered surface 52. The tapered surface 52 of the pressing head 51 contacts with the inner surface of the peripheral wall 32 of the sealing plate 30 and presses the wall 32 radially outwards.

The pressing force of the pressing head 51 is applied to the sealing plate 30 in a direction perpendicular to the tapered surface 52. The component of the applied force perpendicular to the loading axis causes the peripheral wall 32 to be plastically deformed so that a portion of the peripheral wall 32 extrudes into the groove 25 along the meridian. Therefore, the sealing plate 30 is tightly fixed to the outer casing 20.

During this process, the axis of the outer casing 20 and that of the inner race 40 are in alignment with each other. Consequently, a clutch shown in FIG. 4 is obtained.

According to the aforementioned method, the firm engagement of the sealing plate 30 and the outer casing 20 is obtained by applying a relatively small axial force since only the peripheral wall 32 of the sealing plate 30 is loaded while the other parts remain unloaded, and since the deformation occurs almost in the same direction as that of the force applied to the wall 32. Consequently, large loading capacity is not required of the pressing machine.

Figure 8:
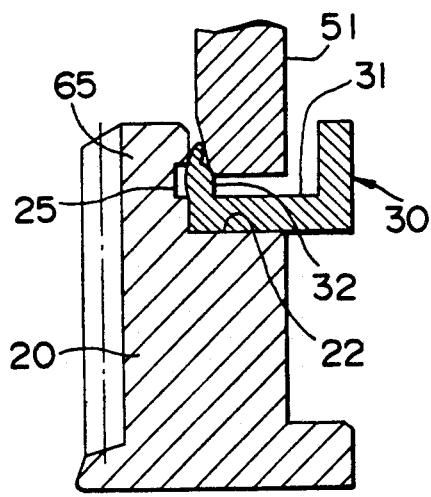
FIG. 8 is a fragmentary axial-sectional view of the outer casing and the sealing plate in FIG. 7, showing a deforming process of a peripheral wall in FIG. 7.
Figure 9:
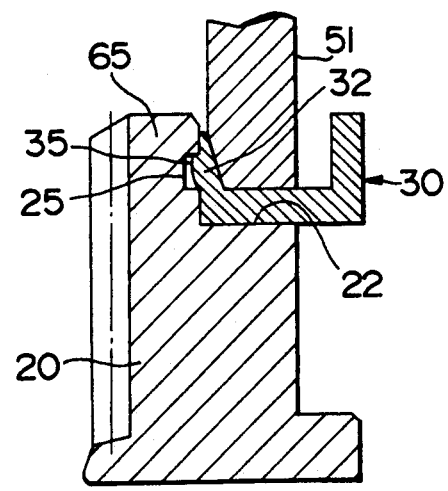
FIG. 9 is a fragmentary axial-sectional view of the outer casing and the sealing plate in FIG. 7, showing the next deforming process of the peripheral wall in FIG. 8.

Another method of fabricating the clutch in FIG. 4 will be explained with reference to FIGS. 7 to 9.

Figure 7:
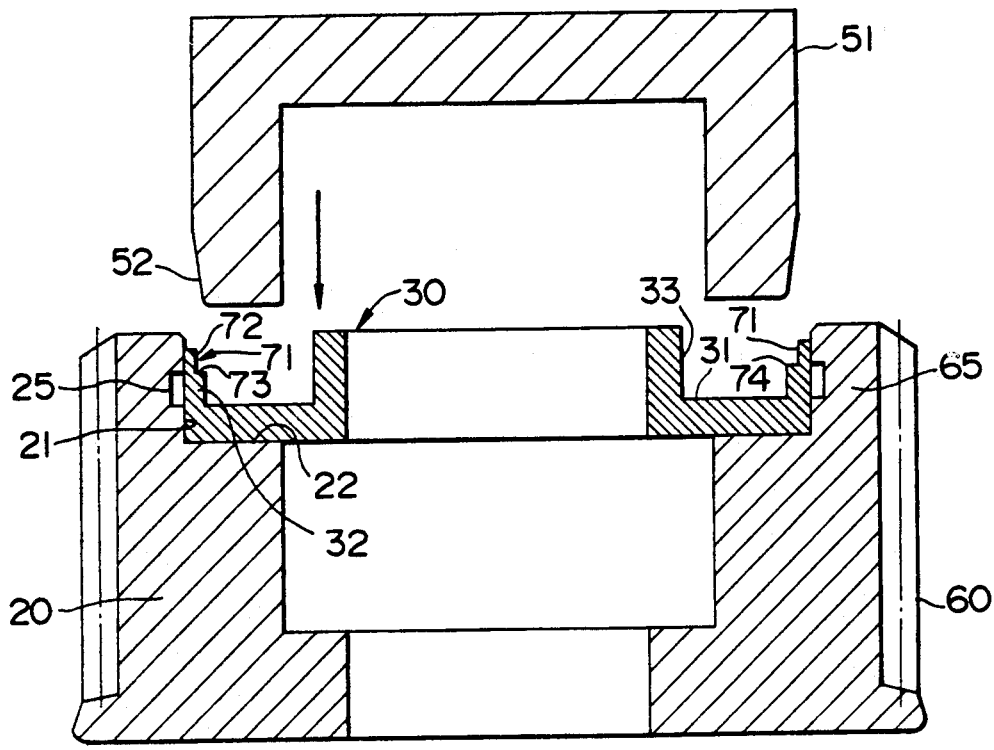
FIG. 7 is an axial-sectional view of the outer casing and another sealing plate, showing another method of fixing the sealing plate to the outer casing.

As shown in FIG. 7, an annular recess 71 is formed in the peripheral wall 32 of the sealing plate 30. This recess 71 opens to both the rear and inner surfaces of the peripheral wall 32 and has a cylindrical surface 72 and an annular surface 73.

After the placement of such a sealing plate 30 within the outer casing 20, the pressing head 51 is moved downward. The tapered surface 52 of the pressing head 51 is brought into contact with the inner periphery 74 of the annular surface 73 of the recess 71. Then, at first, that portion of the peripheral wall 32 adjacent to the inner periphery 74 is pressed radially outward and is deformed as shown in FIG. 8. Secondly, as pressing head 51 is further moved downward, the entire proximal portion of the peripheral wall 32 is deformed, as shown in FIG. 9, so as to protrude into the groove 25.

The force necessary for deforming the peripheral wall 32 is lower than that in the first method, since, in this second method, the peripheral wall 32 is subjected twice to peak load corresponding to the two deforming process. Also, since the deformation of the peripheral wall 32 develops by two steps, unnecessary deformation of the other section of the sealing plate 30 is likely to be prevented from occurring.

Figure 10:
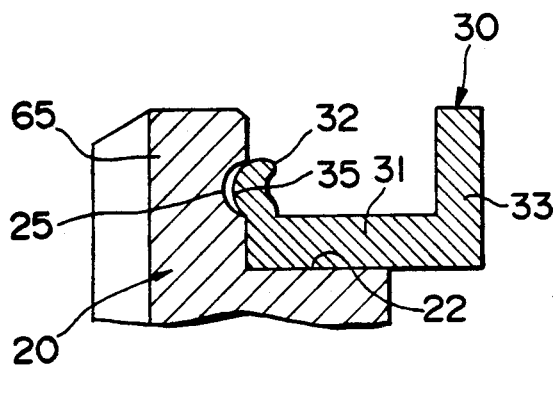
FIG. 10 is a cross-sectional view of a modified form of a groove in FIG. 5.
Figure 11:
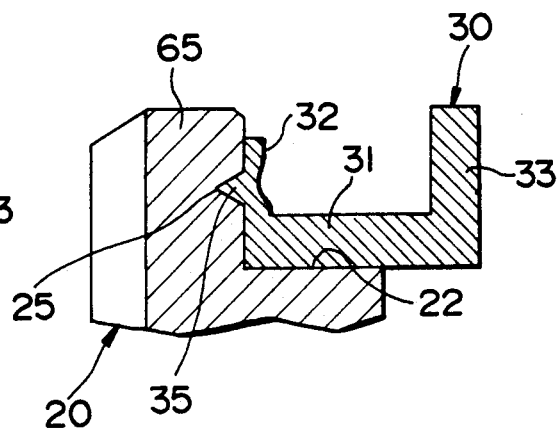
FIG. 11 is a cross-sectional view of another modified form of the groove in FIG. 5.
Figure 12:
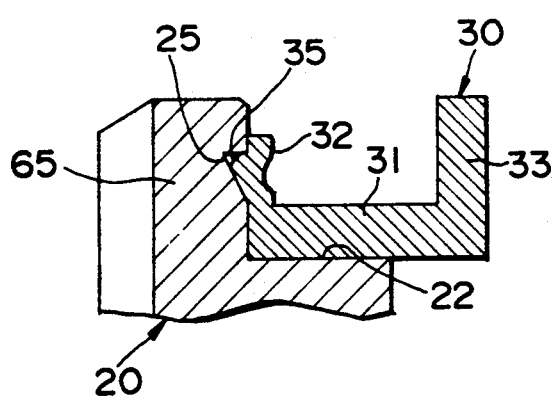
FIG. 12 is a cross-sectional view of still another modified form of the groove in FIG. 5.
Figure 13:
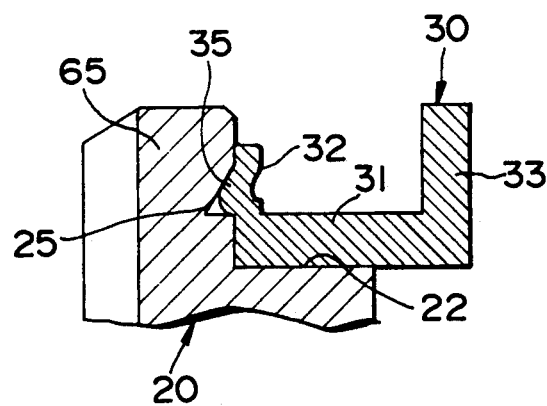
FIG. 13 is a cross-sectional view of a further modified form of the groove in FIG. 5.

In place of the groove 25, a groove with a C-shaped cross-section as shown in FIG. 10 or a V-shaped cross-section as shown in FIGS. 11, 12 and 13 may be employed.

Figure 14:
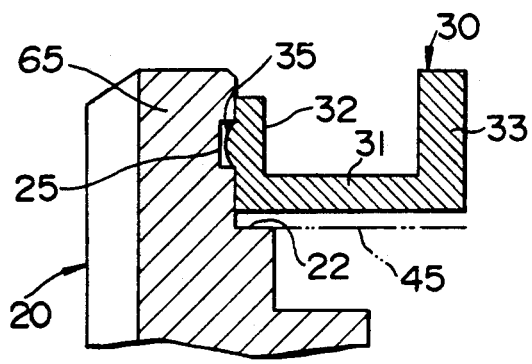
FIG. 14 is a fragmentary axial-sectional view of a modified form of the clutch in FIG. 4.
Figure 15:
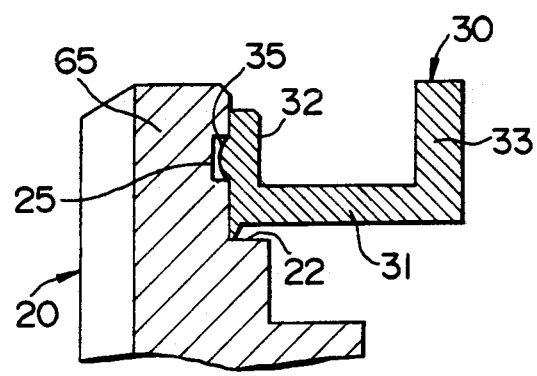
FIG. 15 is a fragmentary axial-sectional view of another modified form of the clutch in FIG. 4.
Figure 16:
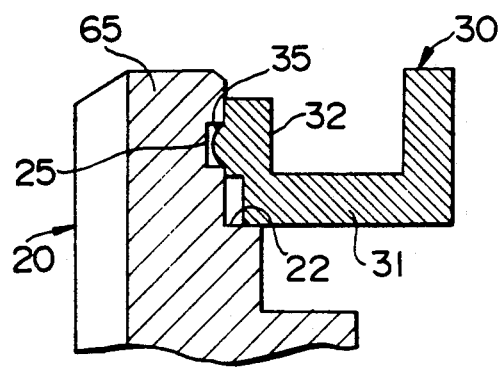
FIG. 16 is a fragmentary axial-sectional view of still another modified form of the clutch in FIG. 4.

Although in the above-mentioned embodiments, the sealing plate 30 is in direct contact with the rear end face 22 of the outer casing 20, a spacer 45, as shown in FIG. 14, may be placed between the casing 20 and the sealing plate 30. Alternatively, as shown in FIGS. 15 and 16, only a portion of the sealing plate 30 may be effectively in contact with the outer casing 20.

Figure 17:
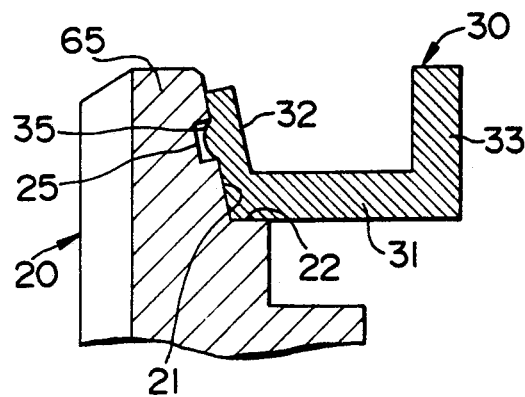
FIG. 17 is a fragmentary axial-sectional view of a modified form of an annular extension in FIG. 4.
Figure 18:
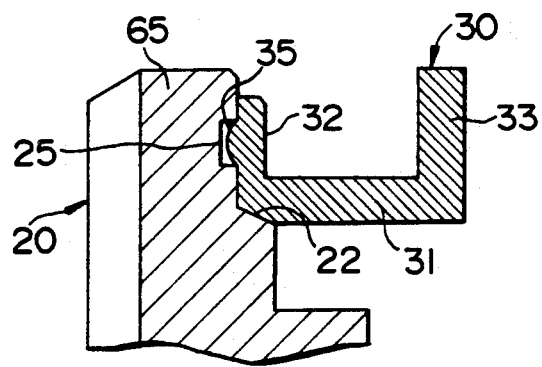
FIG. 18 is a fragmentary axial-sectional view of a modified form of a rear end face of the outer casing in FIG. 4.

Also, as shown in FIG. 17, the inner surface 21 of the annular extension 65 may slightly taper forward or rearward. The rear end face 22 may also taper as shown in FIG. 18.

In the foregoing embodiments, the force to make the peripheral wall 32 be deformed is applied thereto by thrusting the pressing head 51 downward. However, the deforming force may be applied by a pressing means, as shown in FIG. 19, which is capable of applying a radial force.

As shown in FIG. 20, the sealing plate 30 may, alternatively, be fabricated out of an elastic or resilient material in a form wherein the outer surface of the peripheral wall 32 is provided with the ridge 35 beforehand. In this case, the sealing plate 30 is forced to fit into the annular extension 65 so that the ridge 35 is received within the groove 25 without performing the deforming process of the peripheral wall 32. It is possible to fabricate either the sealing plate 30 or the outer casing 20 out of a form-memorable-alloy and to achieve engagement of the two structures by heating them.

Although in the first embodiment, the ridge 35 is in contact with only the rear wall 68 of the groove 25, the ridge 35 may, as shown in FIG. 21, also be in contact with rear wall 69 of the groove 25. In this case, a larger force for the deformation of the peripheral wall 32 is necessary, but as this result, rather improved leak tightness is also obtained.

However the foregoing embodiments are described based on the construction of clutches, the structure and the method according to the present invention can also be applied to bearings when they have outer casings and inner races.

According to the present invention, the sealing plate is firmly fixed to the outer casing so that the sealing property of the sealing plate is enhanced. Also according to the present invention, it is possible to reduce the pressing force necessary for the deformation of the sealing plate. Therefore, in the fabrication of the rotation device, it is unnecessary to employ a pressing machine with a large loading capacity, resulting in the reduction of the installation cost.

Furthermore, because the deformation occurs only in the peripheral wall, the plate body of the sealing plate remains out of deformation and out of stress, thus enhancing the accuracy of the axial alignment of the inner race and the outer casing.

What is claimed is:

1. A sealing arrangement for disposing between first and second parts of a mechanism, the first and second parts being adapted to rotate relative to each other, the rotating device including: a substantially cylindrical inner member adapted to be connected to the first part of the mechanism; a substantially hollow cylindrical outer member coaxially and rotatably disposed on the inner member and adapted to be connected to the second part of the mechanism, the outer member having front and rear end portions, the front end portion substantially fitting around the inner member, the rear end portion being spaced from the inner member so that an inner space receiving a lubricating agent is defined by the inner member and an inner face of the rear end portion, the inner space opening to a rear end face of the outer member; and an annular extension extending rearward away from an outer periphery of the rear end face of the outer member, the annular extension having an annular groove circumferentially formed therein, said annular groove having an opening facing radially inward, the groove having front and rear internal walls defining the groove, the front wall being located closer to the rear end face of the outer member than is the rear wall; the sealing arrangement including a substantially annular sealing plate, which rotatably fits around the inner member and fixedly fits in the annular extension, for closing the opening of the inner space and for aligning the axes of the outer and inner members with each other, the sealing plate comprising:
   an annular plate body having one and the other faces and covering the opening of the inner space with the one face thereof in contact with the rear end face of the outer member;
   an annular peripheral wall extending rearward away from an outer periphery of the other face of the plate body; and
   an annular ridge extending from the peripheral wall and protruding into the groove of the annular extension so that the annular ridge is engaged with at least the rear wall of the groove of the annular extension and so that the one face of the plate body is attached to the rear end face of the outer member so as to hermetically seal the inner space, the rear end face of the outer member and the front wall of the groove defining a distance therebetween which is at least equal to a thickness of the plate body of the sealing plate.

2. A sealing arrangement according to claim 1, wherein the sealing plate is made of a plastically deformable substance of which the Young's modulus is lower than the Young's modulus of the outer member so that the annular ridge of the peripheral wall of the sealing plate is formed by plastic deformation of the peripheral wall of the sealing plate.

3. A sealing arrangement according to claim 2, wherein the annular groove has a generally U-shaped cross-section.

4. A sealing arrangement in a clutch for disposing between driving and driven parts of a mechanism, the driving part being adapted to rotate the driven part, the clutch including: a substantially cylindrical inner member adapted to be drivingly connected to the driven part of the mechanism; a substantially hollow cylindrical outer member coaxially and rotatably disposed on the inner member and adapted to be drivingly connected to the driving part of the mechanism, the outer member having front and rear end portions, the front end portion substantially fitting around the inner member, the rear end portion being spaced from the inner member so that an inner space receiving a lubricating agent is defined by the inner member and an inner face of the rear end portion, the inner space opening to a rear end face of the outer member; means for drivingly connecting and disconnecting the outer and inner members to each other; and an annular extension extending rearward from an outer periphery of the rear end face of the outer member, the annular extension having an annular groove circumferentially formed therein, said annular groove having an opening facing radially inward, the groove having front and rear internal walls defining the groove, the front wall being located closer to the rear end face of the outer member than is the rear wall; the sealing arrangement including a substantially annular sealing plate, which rotatably fits around the inner member and fixedly fits in the annular extension, for closing the opening of the inner space and for aligning the axes of the outer and inner members with each other, the sealing plate comprising:

an annular plate body having one and the other faces and covering the opening of the inner space with the one face thereof in contact with the rear end face of the outer member;

an annular peripheral wall extending rearward away from an outer periphery of the other face of the plate body; and an annular ridge extending from the peripheral wall and protruding into the groove of the annular extension so that the annular ridge is firmly engaged with at least the rear wall of the groove of the annular extension and so that the one face of the plate body is firmly attached to the rear end face of the outer member so as to hermetically seal the inner space, the rear end face of the outer member and the front wall of the groove defining a distance therebetween which is at least equal to the thickness of the plate body of the sealing plate.

5. A sealing arrangement according to claim 4, wherein the sealing plate is made of a plastically deformable substance having a Young's modulus which is lower than the Young's modulus of the outer member so that the annular ridge of the peripheral wall of the sealing plate is formed by plastic deformation of the peripheral wall of the sealing plate.

6. A sealing arrangement, comprising:

an inner member;

an outer member coaxially and rotatably disposed on said inner member, said outer member having a front end portion fit around said inner member, said outer member having a rear end portion spaced away from said inner member so as to define an inner space therebetween, said outer member having an opening to said inner space;

an annular extension projecting from an outer periphery of said outer member;

sealing means for hermetically sealing said inner space and for keeping axes of said inner and outer members aligned with each other, said sealing means including a plate body closing said opening, said plate body being against said rear end portion;

a peripheral wall extending from an outer periphery of said plate body;

means for engaging said peripheral wall with said annular extension, said plate body being free of deformation caused by a stress that arises from engagement of said peripheral wall with said annular extension, said engaging means including a ridge protruding into a groove and engaging against a wall of said groove, said groove being on said annular extension, said ridge extending from said peripheral wall, said outer member having a rear end face to which said inner space is opened, said wall of said groove which is engaged by said ridge being a rear wall, said groove also having a front wall spaced from said rear wall and which is closer to said rear end face of said outer member than is said rear wall, said front wall and said rear end face of said outer member defining a distance therebetween which is at least equal to a thickness of said plate body.

7. A sealing arrangement as in claim 6, wherein said sealing plate is made of a plastically deformable substance having a Young's modulus which is lower than that of said outer member.

* * * * *